(12) United States Patent
Mitsubayashi et al.

(10) Patent No.: US 11,252,305 B2
(45) Date of Patent: Feb. 15, 2022

(54) PROCESSING APPARATUS, IMAGE DEVICE AND SYSTEM WITH IMAGE DATA VIA SINGLE COMMON DATA BUS

(71) Applicant: Sony Semiconductor Solutions Corporation, Kanagawa (JP)

(72) Inventors: Hideki Mitsubayashi, Kanagawa (JP); Takashi Yokokawa, Kanagawa (JP); Naoki Yoshimochi, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 16/094,350

(22) PCT Filed: Apr. 10, 2017

(86) PCT No.: PCT/JP2017/014726
§ 371 (c)(1),
(2) Date: Oct. 17, 2018

(87) PCT Pub. No.: WO2017/203857
PCT Pub. Date: Nov. 30, 2017

(65) Prior Publication Data
US 2019/0124235 A1 Apr. 25, 2019

(30) Foreign Application Priority Data
May 27, 2016 (JP) .............................. JP2016-106555

(51) Int. Cl.
*H04N 5/232* (2006.01)
*H04N 5/073* (2006.01)
(Continued)

(52) U.S. Cl.
CPC ............. *H04N 5/0733* (2013.01); *H04N 5/04* (2013.01); *H04N 5/232* (2013.01); *H04N 5/247* (2013.01); *H04N 7/18* (2013.01); *H04N 7/181* (2013.01)

(58) Field of Classification Search
CPC ............................ H04N 5/0733; H04N 5/247
(Continued)

(56) References Cited

U.S. PATENT DOCUMENTS 11,019,286 B2 * 5/2021 Shim ....................... H04N 5/341
11,070,754 B1 * 7/2021 Zhang ................... H04N 5/3577
(Continued)

FOREIGN PATENT DOCUMENTS

| CN | 1418376 A | 5/2003 |
| CN | 1945417 A | 4/2007 |

(Continued)

OTHER PUBLICATIONS

Japanese Office Action dated Jan. 28, 2020 for corresponding Japanese Application No. 2016-106555.
(Continued)

*Primary Examiner* — Usman A Khan
(74) *Attorney, Agent, or Firm* — Michael Best & Friedrich LLP

(57) ABSTRACT

Provided is a processing apparatus including a processing unit that is connectable to a data bus, and performs output control on respective images captured by a plurality of image sensors connected to the data bus during a predetermined period of time. A timing of output of the image performed by each of the plurality of image sensors is changed by the output control.

19 Claims, 15 Drawing Sheets

(51) Int. Cl.
    *H04N 5/247*     (2006.01)
    *H04N 7/18*     (2006.01)
    *H04N 5/04*     (2006.01)

(58) Field of Classification Search
    USPC ................................................ 348/211.11
    See application file for complete search history.

(56) References Cited

U.S. PATENT DOCUMENTS

| | | | | |
|---|---|---|---|---|
| 2002/0067416 | A1* | 6/2002 | Yoneda | H01L 27/14603 |
| | | | | 348/304 |
| 2002/0074481 | A1* | 6/2002 | McGrath | H04N 5/3765 |
| | | | | 250/208.1 |
| 2006/0077276 | A1 | 4/2006 | Noguchi | |
| 2007/0076112 | A1* | 4/2007 | Nakano | H04N 5/32 |
| | | | | 348/311 |
| 2008/0284890 | A1* | 11/2008 | Miyatake | H04N 3/155 |
| | | | | 348/308 |
| 2010/0329657 | A1* | 12/2010 | Hosoi | H04N 5/2354 |
| | | | | 396/169 |
| 2012/0162511 | A1 | 6/2012 | Hewes et al. | |
| 2012/0305749 | A1* | 12/2012 | Mihara | H04N 5/353 |
| | | | | 250/208.1 |
| 2013/0329127 | A1 | 12/2013 | Hataguchi et al. | |
| 2014/0246562 | A1* | 9/2014 | Van Blerkom | H03M 1/403 |
| | | | | 250/208.1 |
| 2014/0281753 | A1 | 9/2014 | Wagh et al. | |
| 2015/0009288 | A1 | 1/2015 | Wu et al. | |

FOREIGN PATENT DOCUMENTS

| | | |
|---|---|---|
| CN | 101166241 A | 4/2008 |
| CN | 102201419 A | 9/2011 |
| CN | 103828343 A | 5/2014 |
| CN | 104469200 A | 3/2015 |
| JP | 2004023397 A | 1/2004 |
| JP | 2007104349 A | 4/2007 |
| JP | 2009532082 A | 9/2009 |

OTHER PUBLICATIONS

Chinese Office Action dated Apr. 29, 2021 for corresponding Chinese Application No. 2017800310349.
Korean Office Action dated Jul. 28, 2021 for corresponding Korean Application No. 10-2018-7031825.

* cited by examiner

[Fig. 1]
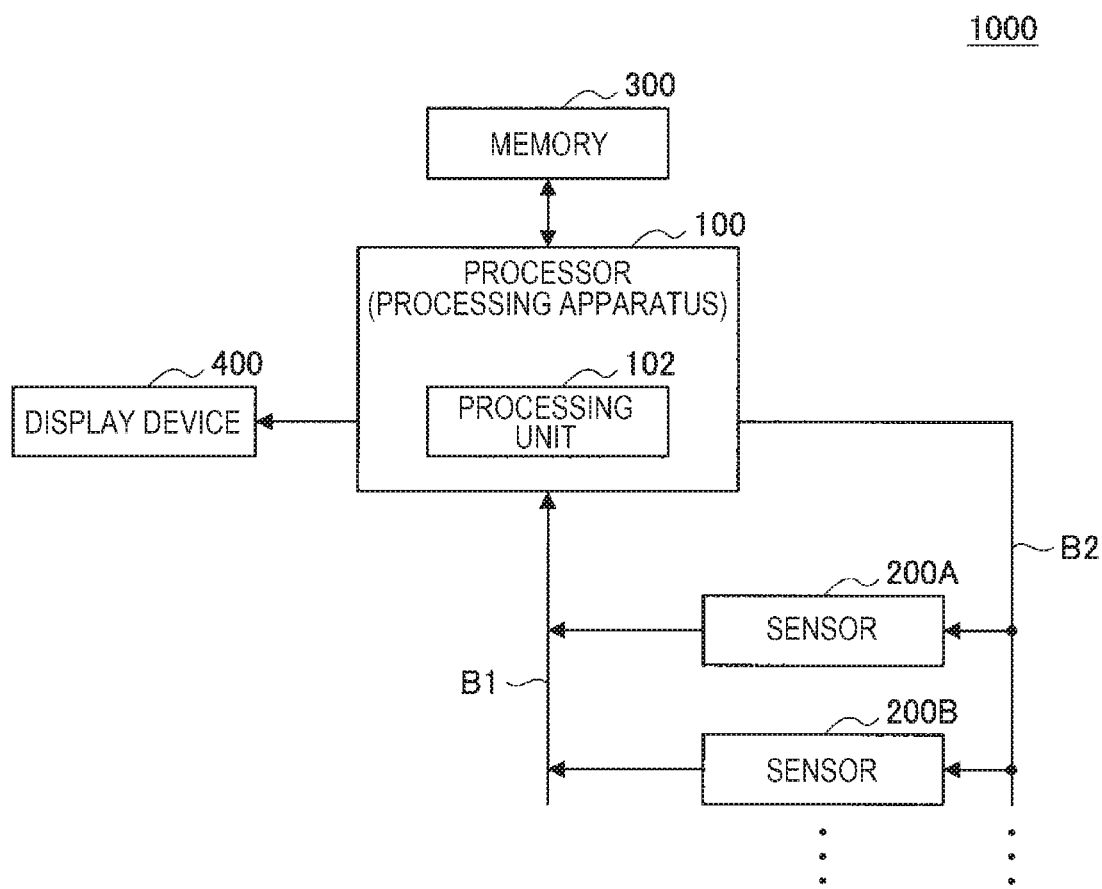

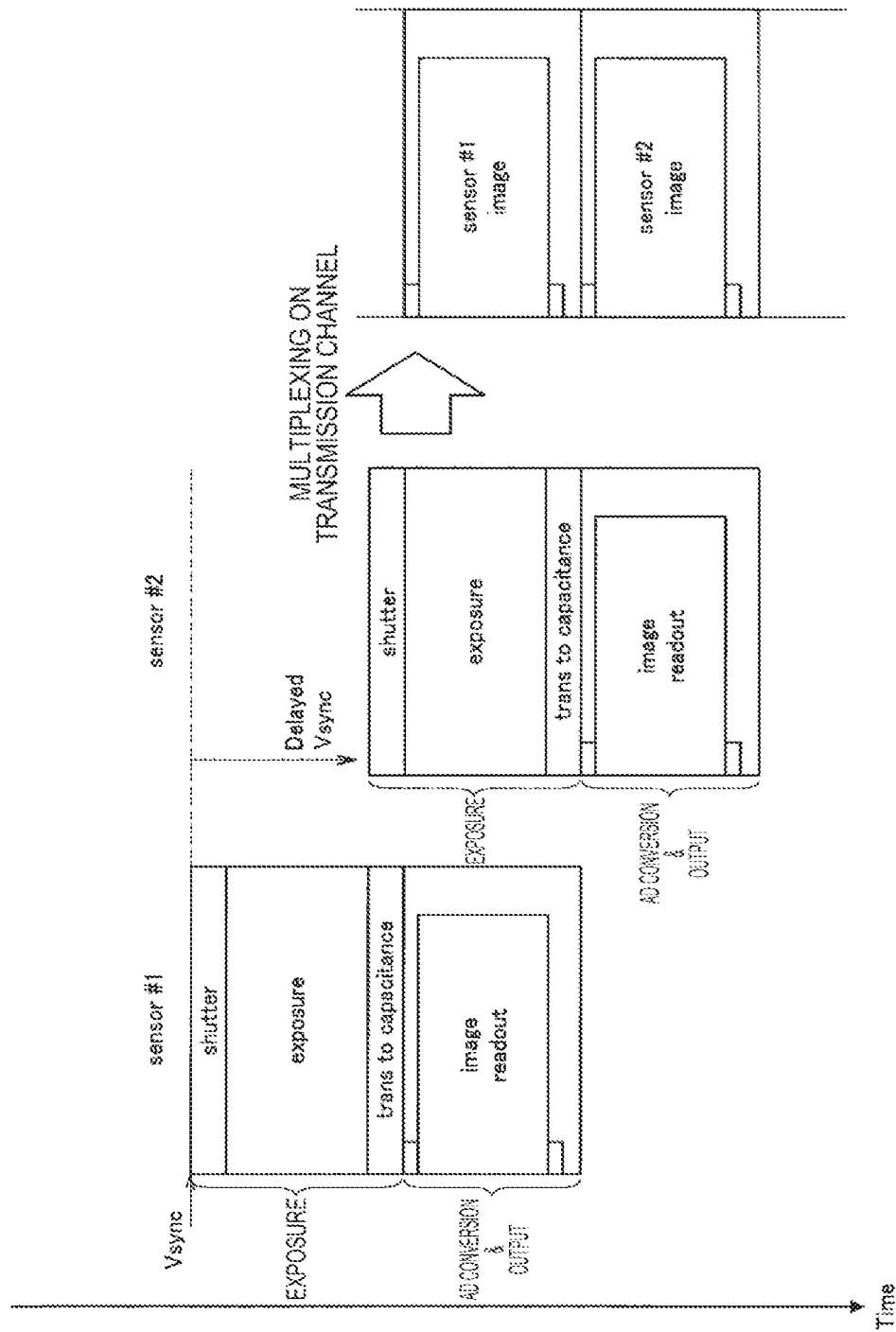
[FIG. 2]

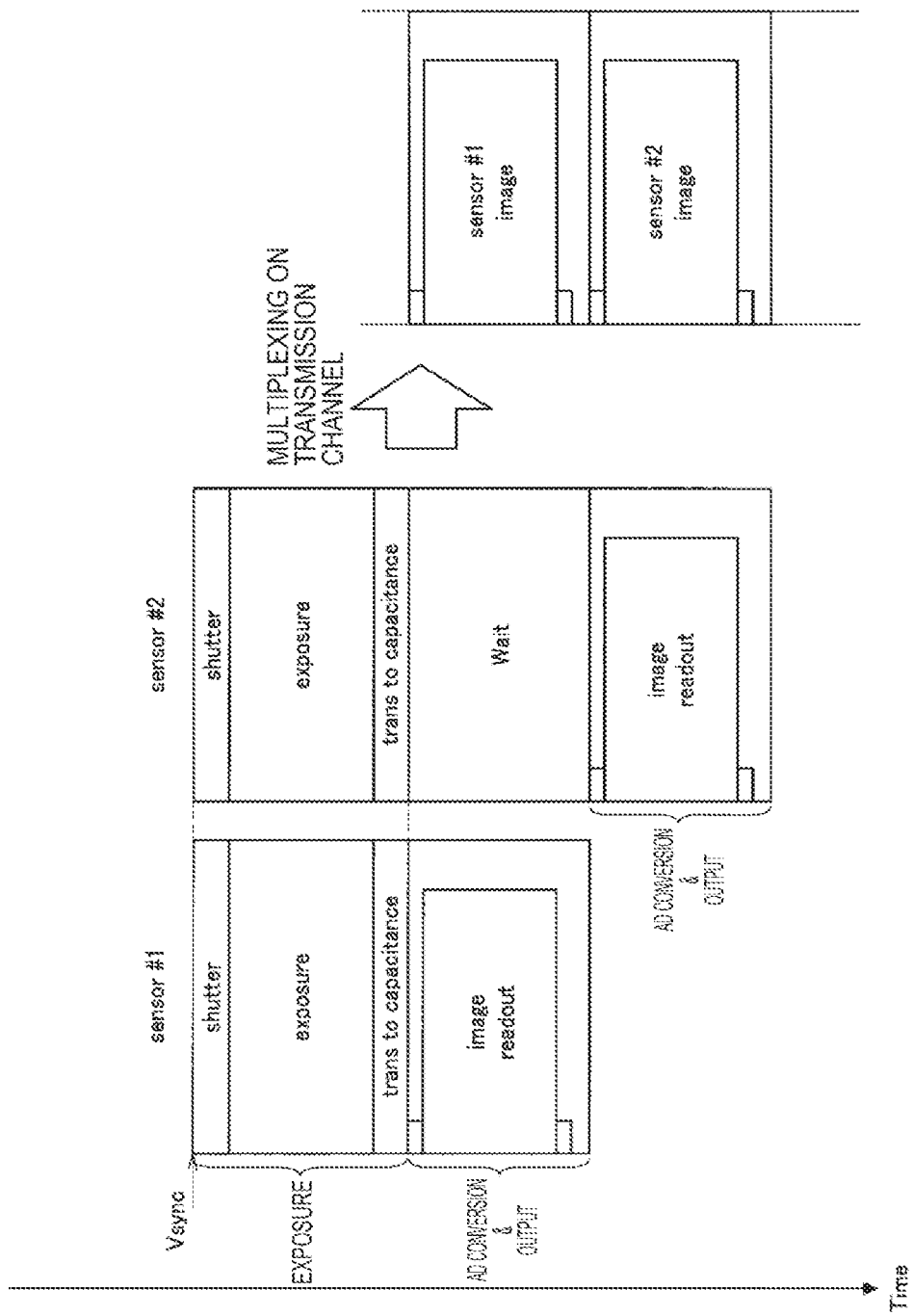
[FIG. 3]

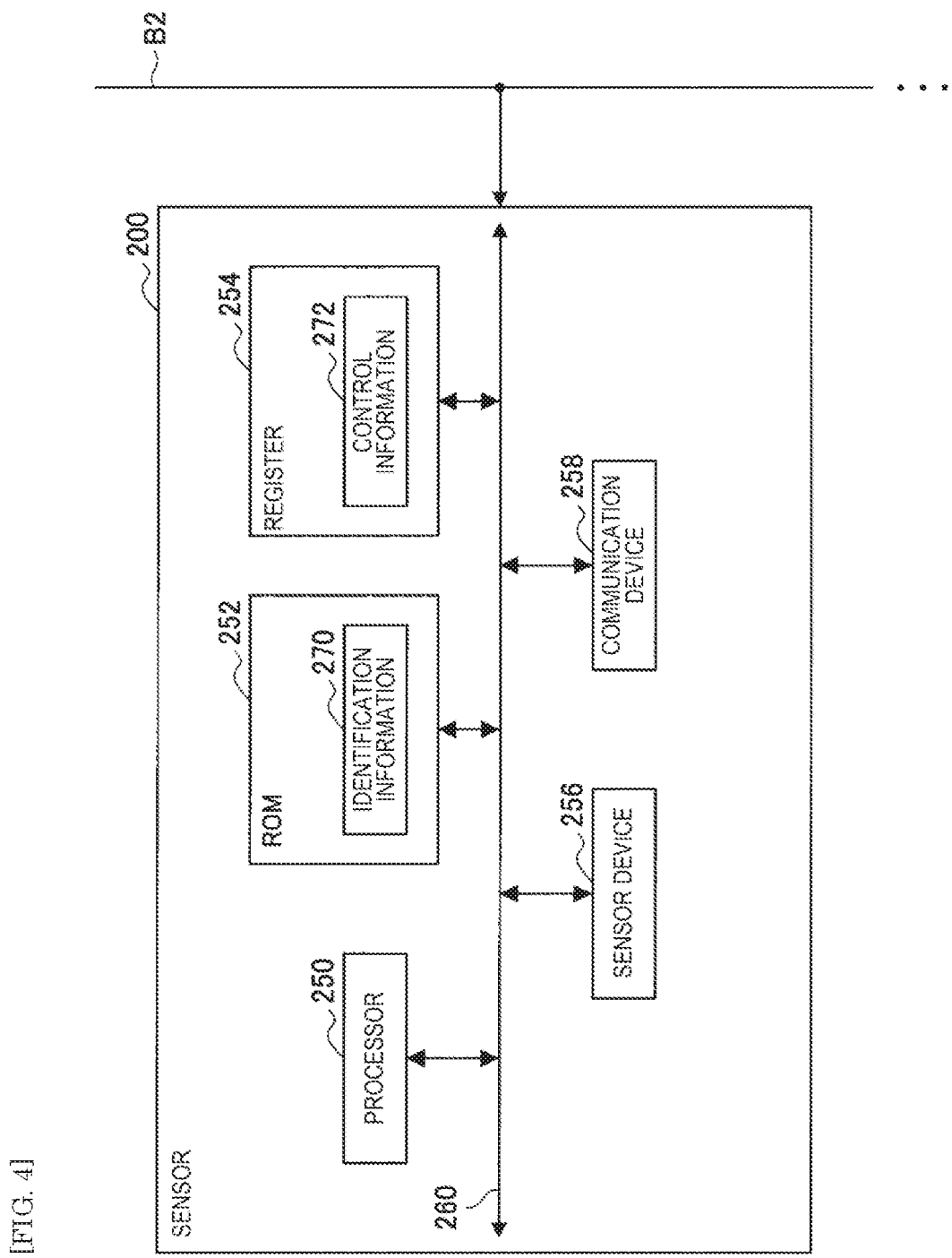
[FIG. 4]

[Fig. 5]

| Line 1 |
|---|
| Line 2 |
| ⋮ |
| Line N-1 |
| Line N |

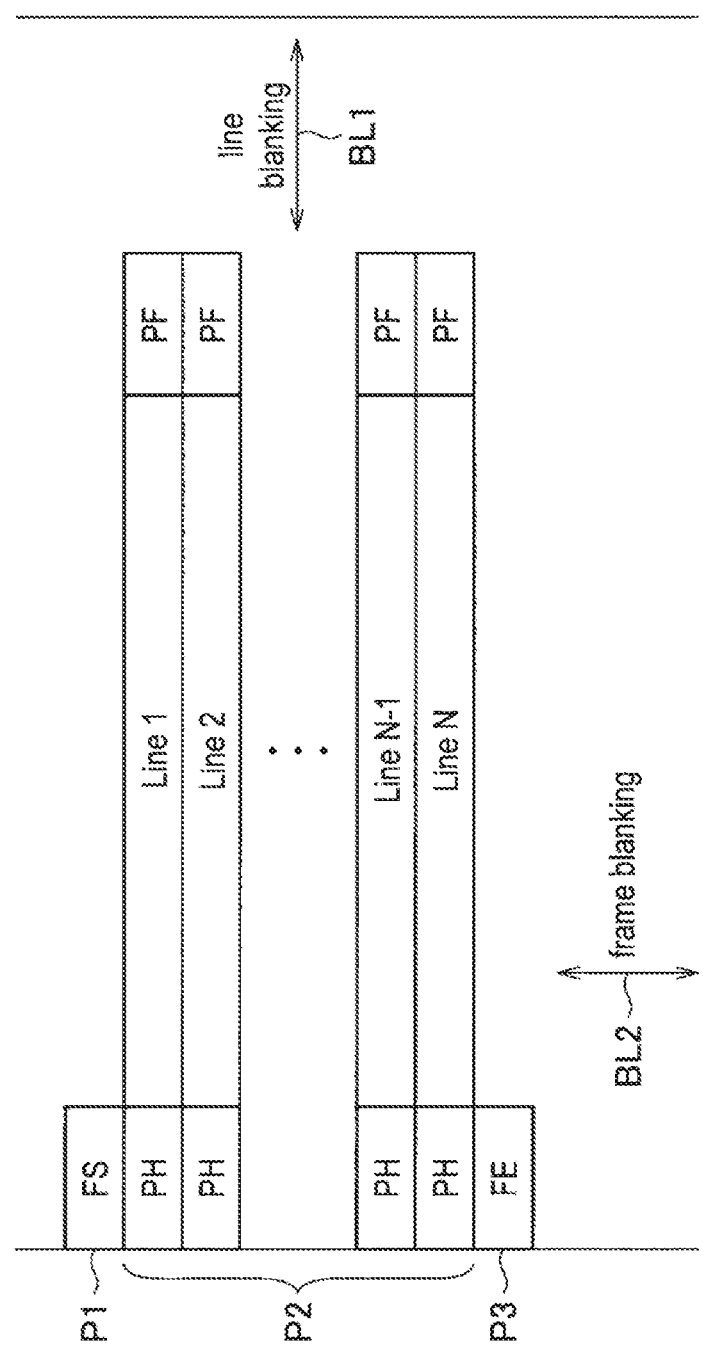
[FIG. 6]

[Fig. 7]
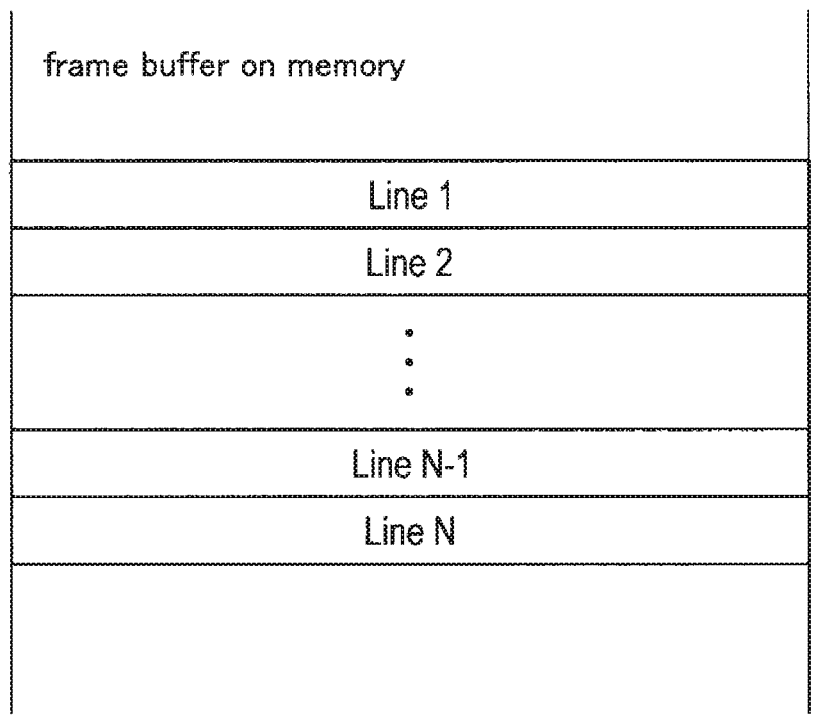

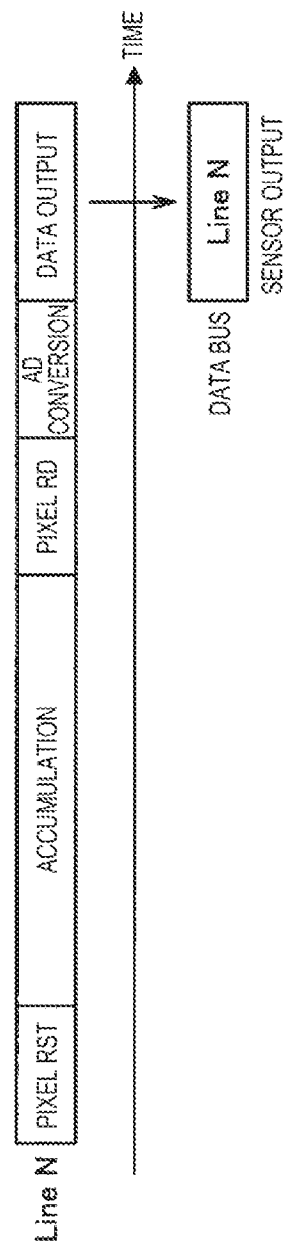
[FIG. 8]

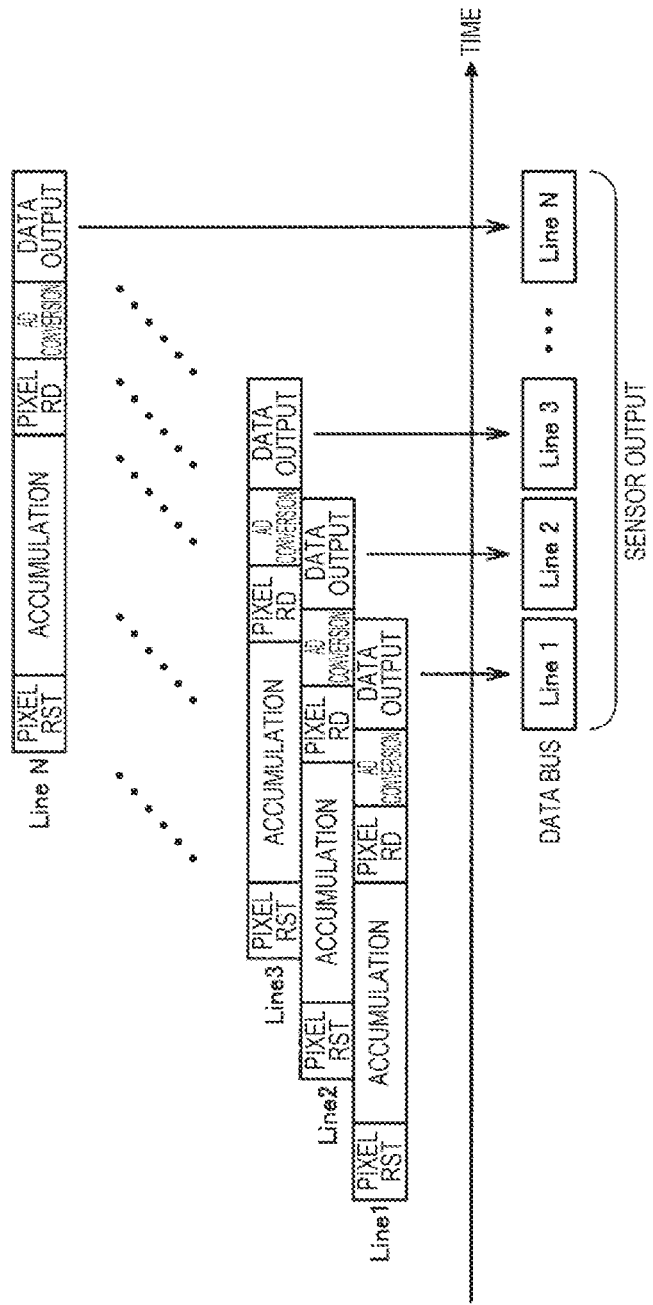
[FIG. 9]

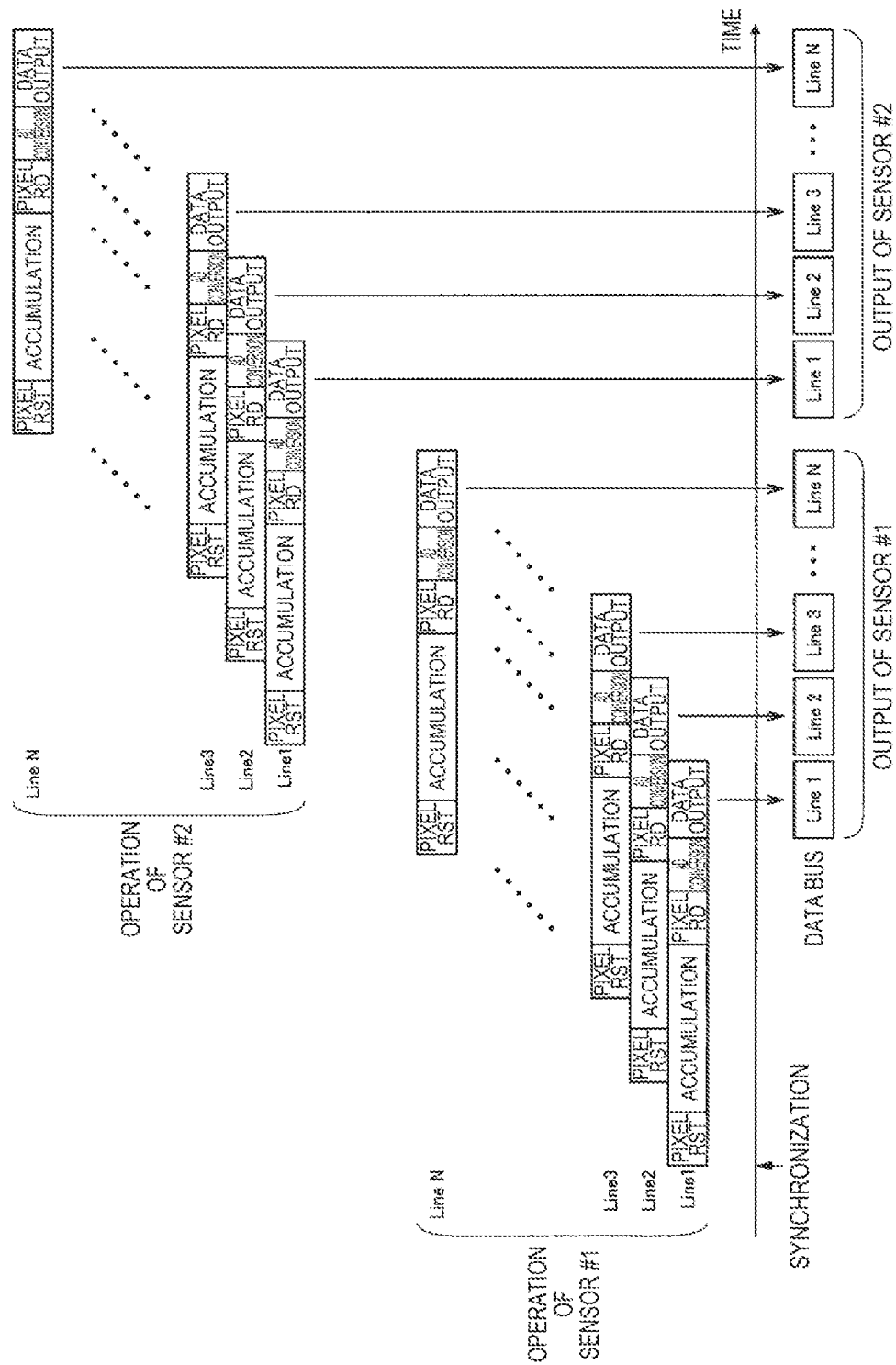

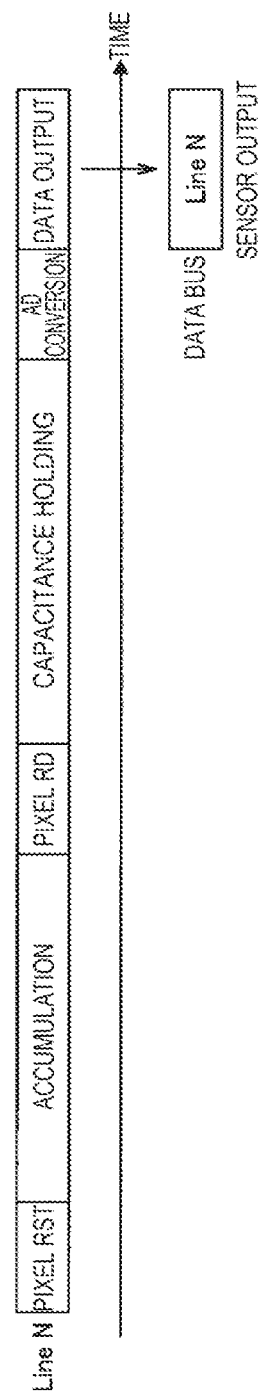
[FIG. 11]

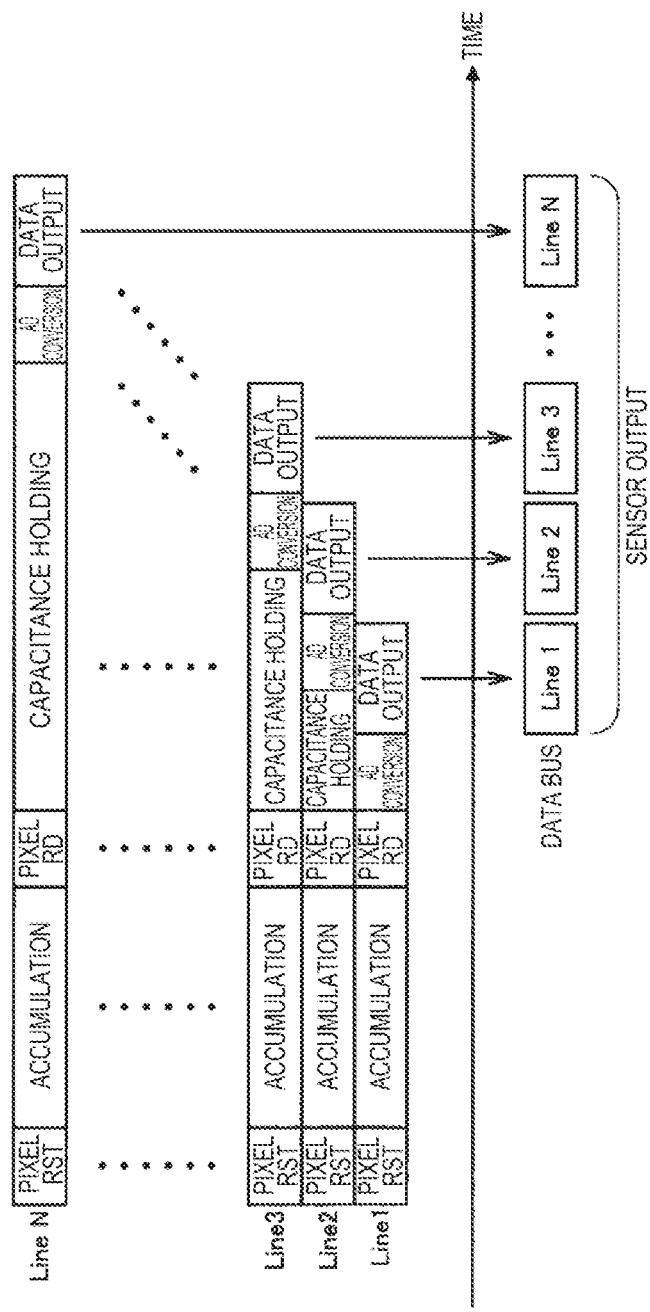
[FIG. 12]

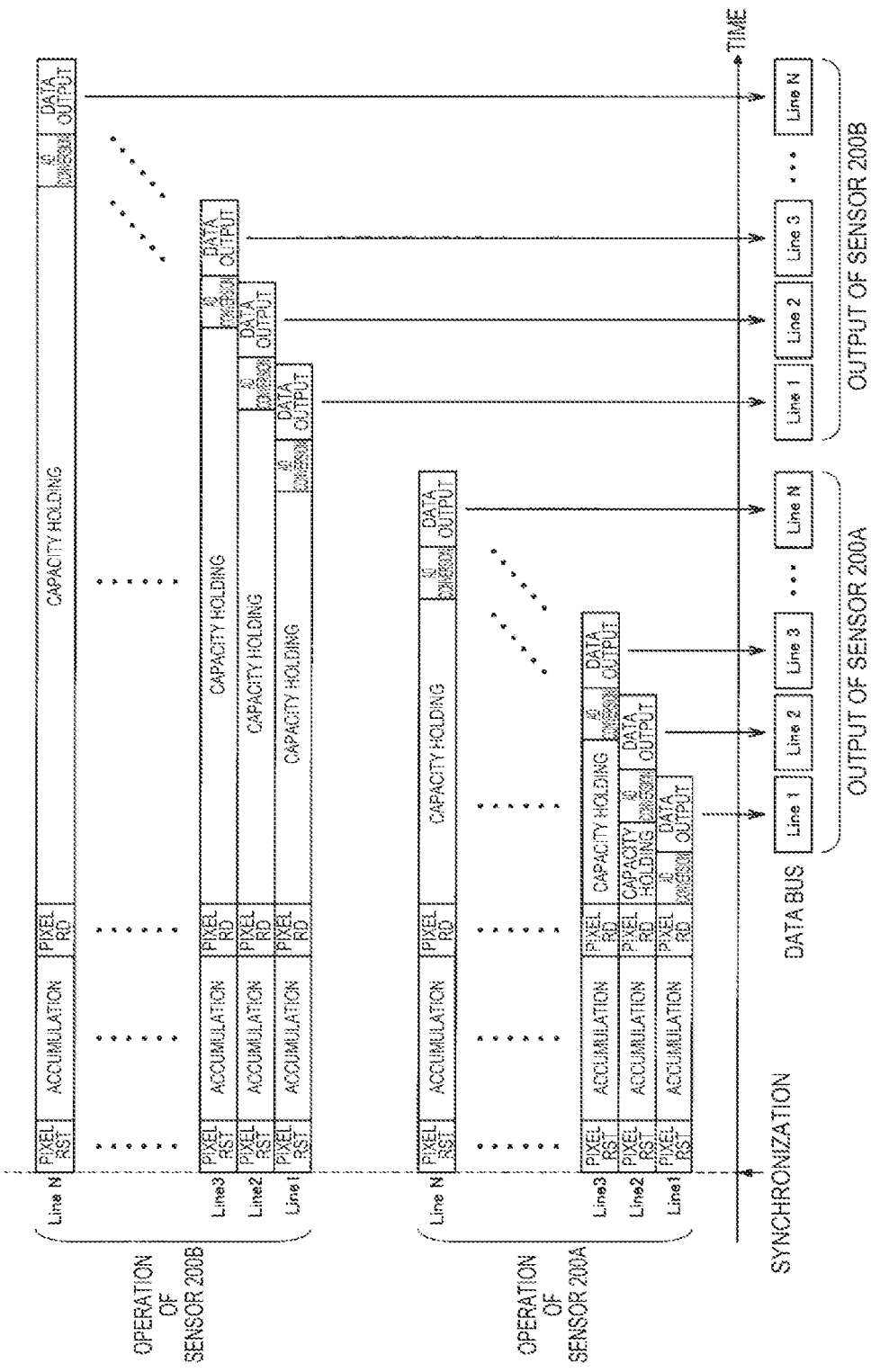

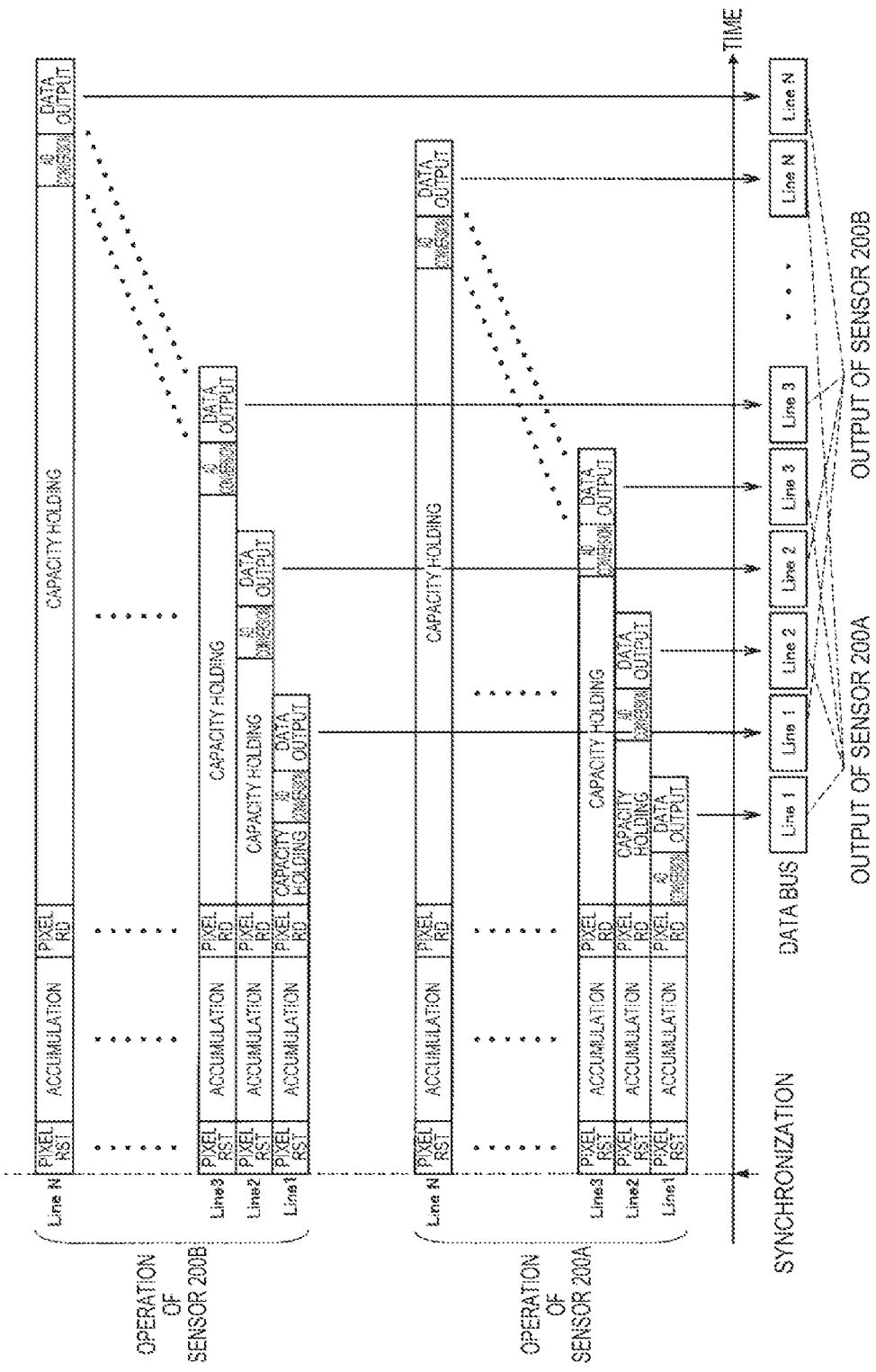

[Fig. 15]
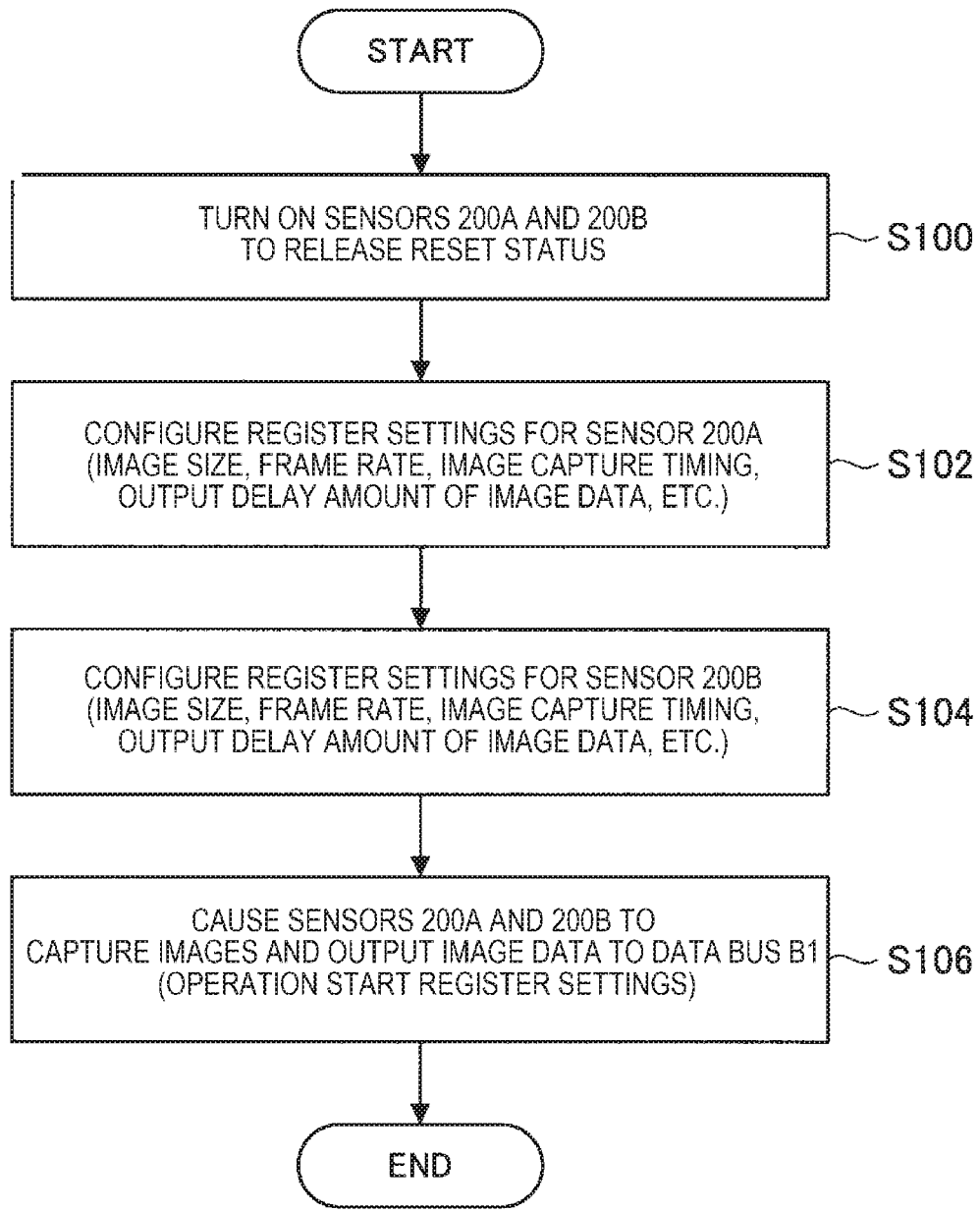

PROCESSING APPARATUS, IMAGE DEVICE AND SYSTEM WITH IMAGE DATA VIA SINGLE COMMON DATA BUS

CROSS REFERENCE TO RELATED APPLICATIONS

This application claims the benefit of Japanese Priority Patent Application JP 2016-106555 filed May 27, 2016, the entire contents of which are incorporated herein by reference.

TECHNICAL FIELD

The present disclosure relates to processing apparatuses, image sensors, and systems.

BACKGROUND ART

Technologies for connection between devices, such as, for example, connection between a processor and a sensor, have been developed. Among such technologies for connection between devices is, for example, a technique disclosed in PTL1 described below.

CITATION LIST

Patent Literature

PTL 1: US 2014/0281753A

SUMMARY

Technical Problem

For example, trends toward improved performance, multifunctionality, and the like of electronic apparatuses, particularly those including a processing apparatus, such as a processor or the like, have been accompanied by some electronic apparatuses including a plurality of image sensors.

Here, as a standard for connecting a processor (an example of the processing apparatus, the same applies in the description that follows) and an image sensor together by a data bus (signal transmission path), there is the Camera Serial Interface 2 (CSI-2) standard of the Mobile industry Processor Interface (MIPI) Alliance. The CSI-2 standard is a standard for connecting a processor and an image sensor together by a data bus in one-to-one correspondence. However, in existing standards such as the CSI-2 standard and the like, it is not assumed that "a processor and a plurality of image sensors are connected together on a data bus."

In embodiments of the present disclosure, proposed are a novel and improved processing apparatus, image sensor, and system in which, in a case where a processing apparatus is connected to a plurality of image sensors by a data bus, respective images which are captured by the plurality of image sensors during a predetermined period of time can be transmitted through the data bus.

Solution to Problem

According to an embodiment of the present disclosure, there is provided a processing apparatus including a processing unit that is connectable to a data bus, and performs output control on respective images captured by a plurality of image sensors connected to the data bus during a predetermined period of time. A timing of output of the image performed by each of the plurality of image sensors is changed by the output control.

In addition, according to an embodiment of the present disclosure, there is provided an image sensor that is connectable to a data bus to which another image sensor is connected, and outputs an image captured during a predetermined period of time, at an output timing based on control information.

In addition, according to an embodiment of the present disclosure, there is provided a system including: a plurality of image sensors that are connected to a data bus, and a processing apparatus that is connected to the data bus. The processing apparatus includes a processing unit that performs output control on respective images captured by the plurality of image sensors during a predetermined period of time, and a timing of output of the image in each of the plurality of image sensors is changed by the output control.

Advantageous Effects of Invention

According to the embodiments of the present disclosure, in a case where a processing apparatus is connected to a plurality of image sensors by a data bus, respective images which are captured by the plurality of image sensors during a predetermined period of time can be transmitted through the data bus.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 1 is an explanatory diagram showing an example of a configuration of a system according to the present embodiment.

FIG. 2 is an explanatory diagram showing an example of a case where images are transmitted by time-division multiplexing on a data bus to which a plurality of sensors are connected.

FIG. 3 is an explanatory diagram for describing an overview of transmission of images in a system according to the present embodiment.

FIG. 4 is an explanatory diagram showing an example of a configuration of a sensor included in a system according to the present embodiment.

FIG. 5 shows an example of image data captured by a sensor included in a system according to the present embodiment.

FIG. 6 shows an example of a packet sequence of image data transmitted on a data bus included in a system according to the present embodiment.

FIG. 7 shows an example of a frame buffer allocated in a memory included in a system according to the present embodiment.

FIG. 8 is an explanatory diagram showing an example of an operation of a sensor 200 equipped with an imaging device which supports the rolling shutter method.

FIG. 9 is an explanatory diagram showing an example of an operation of a sensor equipped with an imaging device supporting the rolling shutter method.

FIG. 10 is an explanatory diagram showing an example of operations of two sensors each equipped with an imaging device supporting the rolling shutter method.

FIG. 11 is an explanatory diagram showing an example of an operation of a sensor equipped with an imaging device supporting the global shutter method.

FIG. 12 is an explanatory diagram showing an example of an operation of a sensor equipped with an imaging device supporting the global shutter method.

FIG. 13 is an explanatory diagram showing a first example of output of an image performed by a sensor in a system according to the present embodiment.

FIG. 14 is an explanatory diagram showing a second example of output of an image performed by a sensor in a system according to the present embodiment.

FIG. 15 is a flowchart showing an example of a process involved in control of output of an image performed by a processor included in a system according to the present embodiment (a process involved in a control method according to according to the present embodiment).

DESCRIPTION OF EMBODIMENTS

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Also, the description that follows will be provided in the following order.

1. Configuration of system according to the present embodiment
2. Output example of image in system according to the present embodiment
3. Program according to the present embodiment Configuration of System According to the Present Embodiment FIG. 1 is an explanatory diagram showing an example of a configuration of a system 1000 according to the present embodiment. Examples of the system 1000 include communication apparatuses (e.g., a smartphone, etc.), mobile apparatuses (e.g., a drone (an apparatus which can be remotely operated or autonomously operate), automobile, etc.), and the like. Note that application examples of the system 1000 are not limited to those described above. Other application examples of the system 1000 will be described below.

The system 1000 has, for example, a processor 100 (a processing apparatus according to the present embodiment), a plurality of sensors 200A, 200B, . . . (an image sensor according to the present embodiment) which have a function of outputting an image, a memory 300, and a display device 400. The plurality of sensors 200A, 200B, . . . may be collectively referred to as "sensors 200," or one of the plurality of sensors 200A, 200B, . . . may be representatively referred to as a "sensor 200."

Although the system 1000 shown in FIG. 1 has two or more sensors 200, the number of sensors 200 included in the system according to the present embodiment is not limited to the example shown in FIG. 1. For example, the system according to the present embodiment may have any number of sensors 200 that are at least two sensors 200, such as two sensors 200, three sensors 200, or the like. In the description that follows, for the sake of convenience, a case where an image is output by two of the plurality of sensors 200 included in the system 1000 will be mainly described by way of example.

The processor 100 and of the respective sensors 200 are electrically connected together by a single data bus B1. The data bus B1 is a single signal transmission path which connects the processor 100 and the respective sensors 200 together. For example, data indicating an image output by each sensor 200 (may hereinafter be referred to as "image data") is transmitted from the sensor 200 to the processor 100 through the data bus B1.

In the system 1000, a signal is transmitted through the data bus B1 in accordance with any standard that allows for time-division multiplexing transmission of data, such as the CSI-2 standard, PCI Express, or the like. In the description that follows, an example will be described in which a signal is transmitted through the data bus B1 in accordance with the CSI-2 standard.

The processor 100 and the respective sensors 200 are also connected together by a control bus B2 different from the data bus B1. The control bus B2 is another signal transmission path which connects the processor 100 and the respective sensors 200 together. For example, control information (described below) which is output by the processor 100 is transmitted from the processor 100 to the sensors 200 through the control bus B2. In the description that follows, an example will be described in which, as in the case of the data bus B1, a signal is transmitted through the control bus B2 in accordance with the CSI-2 standard. Although FIG. 1 shows the example in which the processor 100 and the respective sensors 200 are connected together by the single control bus B2, the system according to the present embodiment can have a configuration in which a separate control bus is provided for each sensor 200. Also, the present disclosure is not limited to the configuration in which the processor 100 transmits and receives control information (described below) to and from the respective sensors 200 through the control bus B2. Alternatively, for example, a configuration may be employed in which control information (described below) is transmitted and received through wireless communication having any communication scheme that can be used to transmit and receive control information (described below).

<1> Overview of Transmission of Image in System 1000

Prior to describing the configuration of the system 1000, an overview of transmission of images in the system 1000 will be described.

In a case where a plurality of sensors having a function of outputting an image are connected together by a data bus as in the system 1000, it would be conceived that images are transmitted by time-division multiplexing in order to avoid a collision between data transmitted on the data bus.

FIG. 2 is an explanatory diagram showing an example of a case where images are transmitted by time-division multiplexing on a data bus to which a plurality of sensors are connected. FIG. 2 shows an example of time-division multiplexing transmission in a case where two sensors each having an imaging device (a sensor #1 and a sensor #2 shown in FIG. 2) output an image to the data bus immediately after performing image capture.

As shown in FIG. 2, when each sensor outputs an image to the data bus immediately after performing image capture, it is necessary to put the exposure timing of one sensor behind that of the other in order to achieve time-division multiplexing transmission.

Therefore, in the example shown in FIG. 2, the sensors have different image capture timings, and therefore, the two sensors do not capture images at the same time (or captured images are not considered to be captured at the same time).

With the above in mind, in the system 1000, time-division multiplexing transmission is achieved by causing a plurality of sensors to perform image capture during a predetermined period of time, and output images at different timings. In the system 1000, control of image capture performed by a plurality of sensors, and control of timings at which the plurality of sensors output images, are performed by, for example, the processor 100.

Here, examples of the meaning of the wording "during a predetermined period of time" according to the present embodiment include "during a 1-frame period," "during a period of time corresponding to a difference of several lines of an image," "at the same time," and the like. Note that the meaning of the wording "during a predetermined period of time" according to the present embodiment is not limited to the above examples. The meaning of the wording "during a predetermined period of time" according to the present embodiment may, for example, be "during an arbitrary period of time" which is set by a designer, user, or the like of the system 1000, regarding image capture performed by a plurality of sensors during that period of time as being performed at the same time.

Image capture performed by a plurality of sensors during a predetermined period of time is, for example, controlled according to control information for controlling image capture which is transmitted by the processor 100 through the control bus B2.

The control information for controlling image capture is, for example, data containing an image capture command (an example of a process command).

Also, the control information for controlling image capture may contain a synchronization signal for causing a plurality of sensors to operate synchronously. In a case where image capture performed by sensors is controlled according to the control information containing a synchronization signal, it can be said that "images captured by a plurality of sensors during a predetermined period of time are images which are synchronously captured by the plurality of image sensors." Note that, as described below, in the system 1000, the synchronization signal may be transmitted by one of the plurality of sensors 200 included in the system 1000 that functions as a master.

FIG. 3 is an explanatory diagram for describing an overview of transmission of images in the system 1000 according to the present embodiment. FIG. 3 shows an example in which two sensors (a sensor #1 and a sensor #2 shown in FIG. 3) each have an imaging device, and capture images synchronously on the basis of reception of a synchronization signal Vsync.

Here, in the system 1000, the synchronization signal Vsync is transmitted from the processor 100 through the control bus B2, for example. Since the synchronization signal Vsync is transmitted from the processor 100 through the control bus B2, a plurality of sensors 200 can be synchronously operated in the system 1000. In other words, in the system 1000, for example, image capture and image output performed by a plurality of sensors 200 can be synchronized under the control of the processor 100 through the control bus B2.

Note that the method of synchronously operating a plurality of sensors 200 in the system 1000 is not limited to the above "method in which the processor 100 transmits a synchronization signal Vsync to all sensors 200 included in the system 1000."

For example, in the system 1000, after the processor 100 activates each sensor 200 through the control bus B2, one of the plurality of sensors 200 may function as a master so that the plurality of sensors 200 are synchronized. Specifically, in the system 1000, the sensor 200 functioning as a master transmits a synchronization signal Vsync to the other sensors 200 (sensors 200 functioning as a slave). In the system 1000, the synchronous operation of the plurality of sensors 200 is achieved by the other sensors 200 receiving a synchronization signal Vsync transmitted by the sensor 200 functioning as a master. Here, the transmission and reception of a synchronization signal Vsync between each sensor 200 are performed through, for example, a 1-bit dedicated line between each sensor 200.

As shown in FIG. 3, the two sensors perform image capture synchronously according to the synchronization signal Vsync. Thereafter, the two sensors output captured images at different timings so that pieces of data indicating the captured images do not collide with each other on the data bus B1. For example, in the example shown in FIG. 3, the sensor #1 outputs an image to the data bus immediately after performing image capture, and the sensor #2 outputs an image to the data bus after a delay of a delay amount indicated by "wait" in FIG. 3 from performing image capture.

Therefore, in the example shown in FIG. 3, images having the same image capture timing between sensors (images captured during a predetermined period of time) can be transmitted by time-division multiplexing on the data bus B1.

A process involved in control according to the present embodiment for achieving the transmission shown in FIG. 3 will now be described together with the configuration of the system 1000 shown FIG. 1.

<2> Processor 100 (Processing Apparatus According to the Present Embodiment

The processor 100 includes one or more processors, various processing circuits, or the like which include a computation circuit, such as a micro-processing unit (MPU) or the like. The processor 100 also has, for example, terminals to which external buses are connected, such as a terminal to which the data bus B1 can be connected, a terminal to which the control bus B2 can be connected, and the like, and can be connected to external buses, such as the data bus B1 and the like. The processor 100 is driven with power supplied from an internal power supply (not shown), such as a battery or the like, included in the system 1000, or power supplied from a power supply external to the system 1000.

The processor 100 is an example of the processing apparatus according to the present embodiment. The processing apparatus according to the present embodiment is applicable to any circuits and devices that can perform a process (process involved in a control method according to the present embodiment) performed by a processing unit described below.

The processor 100 performs "control of output of images captured by a plurality of sensors 200 connected to the data bus B1 during a predetermined period of time (the control method according to according to the present embodiment control)."

The output control of an image is performed by, for example, a processing unit 102 included in the processor 100. In the processor 100, a specific processor (or a specific processing circuit) or a plurality of processors (or a plurality of processing circuits) which perform the output control of an image, function as the processing unit 102.

Note that the processing unit 102 is in charge of a portion of the functionality of the processor 100 for the sake of convenience. Therefore, in the processor 100, for example, the output control of an image according to the present embodiment may be performed by a plurality of functional blocks. In the description that follows, an example will be described in which the output control of an image according to the present embodiment is performed by the processing unit 102.

<1-1> Example of Output Control of Image According to the Present Embodiment

The processing unit 102 performs the output control of an image by transmitting control information to each sensor 200.

The control information according to the present embodiment includes, for example, identification information indicating a sensor 200, and information for controlling the sensor 200. The identification information according to the present embodiment is, for example, any data that can be used to identify a sensor 200, such as an ID set for the sensor 200 or the like. A specific example of information for control according to the present embodiment will be described below.

The control information is transmitted through, for example, the control bus B2 as described above.

Also, the control information transmitted by the processing unit 102 is, for example, recorded into a register (an example of a recording medium) included in each sensor 200. Thereafter, as described below, the sensors 200 output images which have been captured during a predetermined period of time, at output timings based on the control information stored in their registers.

As the image output control, the processing unit 102 performs any of control according to a first example described below in (1) to control according to a third example described below in (3), for example. Note that examples of output of images in the system 1000 which is achieved by image output control according to the present embodiment will be described below.

(1) First Example of Image Output Control: Control of Delay

The processing unit 102 controls a delay in output of an image performed by a sensor 200.

For example, the processing unit 102 controls a delay in output of an image performed by a sensor 200, by transmitting, to the sensor 200, the control information containing data indicating the amount of a delay in output of an image (first output information, an example of information for control). Examples of the data indicating the amount of a delay in output of an image (may hereinafter be referred to as "data indicating a delay amount") include data directly indicating a delay amount using a numerical value or the like (e.g., data indicating a delay time, etc.), data indirectly indicating a delay amount (e.g., an ID associated with the delay amount, etc.), and the like.

(2) Second Example of Image Output Control: Control of Transmission Interval

The processing unit 102 controls intervals at which packets are output when the sensor 200 outputs an image. Packets used in output of an image are, for example, data in units of a line in the image.

For example, the processing unit 102 controls intervals at which packets are output when the sensor 200 outputs an image, by transmitting, to the sensor 200, the control information containing data (second output information, an example of information for control) indicating intervals (data pitch) at which packets are output when an image is output. Examples of the data indicating intervals at which packets are output when the sensor 200 outputs an image (may hereinafter be referred to as "data indicating an output interval between packets") include data directly indicating the output interval using a numerical value (e.g., data indicating a time interval, etc.), data indirectly indicating the output interval (e.g., an ID associated with the output interval, etc.), and the like.

(3) Third Example of Image Output Control

The processing unit 102 may perform both the control according to the first example described above in (1) and the control according to the second example described above in (2).

As the image output control, the processing unit 102 performs the control according to the first example described above in (1) to the control according to the third example described above in (3), for example.

The processor 100 is, for example, equipped with the processing unit 102 in order to perform a process involved in the above image output control (a process involved in the control method according to according to the present embodiment).

Here, by the processor 100 performing the control according to the first example described above in (1) to the control according to the third example described above in (3), one or both of a delay in output of an image and an output interval between packets used in output of an image are controlled according to the control information stored in the register or the like in each sensor 200.

Therefore, the processor 100 can change an image output timing in each sensor 200 (image sensor) by performing the process involved in the image output control. In other words, in the system 1000, an image output timing in each sensor 200 can be changed by the processor 100 performing the image output control.

Note that the process performed by the processor 100 is not limited to the above process involved in the image output control.

For example, the processor 100 can control an image to be output by transmitting the control information to each sensor 200. The control of an image to be output is performed by, for example, the processing unit 102.

The control of an image to be output according to the present embodiment is, for example, one or both of control of a size of an image to be output by each sensor 200 and control of a frame rate of an image to be output by each sensor 200.

For example, the processor 100 transmits control information containing one or both of data indicating an image size and data indicating a frame rate (an example of information for control) to a sensor 200, to control an image to be output by the sensor 200.

For example, the processor 100 can perform various processes such as a process involved in control of recording of image data received via the data bus B1 into a recording medium such as the memory 300 or the like, a process involved in control of displaying of an image on a display screen of the display device 400, a process of executing any application software, and the like. The process involved in control of recording is, for example, a "process of transferring control data containing a record instruction and data to be recorded into a recording medium, to a recording medium such as the memory 300 or the like." Also, the process involved in control of displaying is, for example, a "process of transferring control data containing a display instruction and data to be displayed on a display screen, to a display device such as the display device 400 or the like."

<3> Sensor 200 (Image Sensor According to the Present Embodiment)

The sensors 200 are an image sensor. The image sensor according to the present embodiment includes, for example, an imaging device, such as a digital still camera, digital video camera, stereo camera, or the like, or any sensor device having an image capturing function, such as an infrared sensor, range imaging sensor, or the like, to have a function of outputting an image generated by the image capturing. Here, an image generated by the sensor 200 corresponds to data indicating the result of sensing performed by the sensor 200.

For example, as shown in FIG. 1, a sensor 200 is connected to the data bus B1 to which other sensors 200 are connected.

As described above, image capture performed by the sensors 200 is, for example, performed according to the control information received through the control bus B2, under the control of the processor 100. For example, by the processor 100 controlling image capture performed by the sensors 200, image capture performed by one sensor 200 and image capture performed by another sensor 200 included in the system 1000 are performed during a predetermined period of time.

Also, the sensors 200 output images at output timings based on the control information. Here, image capture performed by one sensor 200 and image capture performed by another sensor 200 are performed during a predetermined period of time. Therefore, it can be said that the images output by the sensors 200 according to the control information are images captured during the predetermined period of time. As described above, the control information is transmitted from the processor 100, and is received by the sensors 200 through the control bus B2, for example.

FIG. 3 is an explanatory diagram showing a configuration example of the sensor 200 included in the system 1000 according to the present embodiment. The sensor 200 has, for example, a processor 250, a ROM 252, a register 254, a sensor device 256, and a communication device 258. Also, these constituent elements in the sensor 200 are connected together by, for example, an internal bus 260. The sensor 200 also has, for example, terminals to which external buses are connected, such as a terminal to which the data bus B1 can be connected, a terminal to which the control bus B2 can be connected, and the like, and can be connected to external buses, such as the data bus 131 and the like. The sensor 200 is driven by power supplied from an internal power supply (not shown), such as a battery or the like, included in the system 1000, or power supplied from a power supply external to the system 1000.

Note that the configuration of the sensor 200 is not limited to the example shown in FIG. 4. For example, the sensor 200 may be further equipped with a recording medium for temporarily holding an image to be output. Examples of the recording medium for temporarily holding an image to be output include volatile memories (e.g., a random access memory (RAM), etc.), non-volatile memories (e.g., a flash memory, etc.), and the like.

Here, when an imaging device functioning as the sensor device 256 described below is an imaging device which supports the global shutter method, a holding capacitance for holding signal charge which is included in the imaging device can be utilized to temporarily hold an image.

Therefore, when the sensor 200 includes, as the sensor device 256, an imaging device which supports the global shutter method, it is not necessary for the sensor 200 to be additionally equipped with the above recording medium for temporarily holding an image. When it is not necessary to be additionally equipped with the above recording medium for temporarily holding an image, the size or cost of the sensor 200 can be reduced, for example.

The processor 250 has a function of controlling the entire sensor 200. Examples of the control performed by the processor 250 include control of recording of received control information into the register 254, control of operation of the sensor device 256, control of communication of the communication device 258, and the like.

A process example involved in the control of recording of received control information is a "process of comparing identification information contained in the received control information with identification information 270 stored in the ROM 252, and on the basis of the result of the comparison, selectively recording the received control information into the register 254." For example, when the identification information contained in the received control information matches the identification in formation 270 stored in the ROM 252, the processor 250 selectively records the received control information into the register 254.

A process example involved in the control of operation of the sensor device 256 is a "process of transferring, to the sensor device 256, a control signal containing an instruction to operate the sensor device 256 when receiving the control information containing an image capturing instruction."

A process example involved in the control of communication of the communication device 258 is a "process of transferring a control signal containing a transmit instruction and data to be transmitted, to the communication device 258."

The ROM 252 is a recording medium included in the sensor 200. The ROM 252 stores, for example, identification information.

The register 254 is another recording medium included in the sensor 200. The register 254 stores, for example, control information received through the control bus B2. Although FIG. 4 shows an example in which the control information is stored in the register 254, the control information may be stored in other recording media, such as non-volatile memories (e.g., a flash memory, etc.), magnetic recording media (e.g., a hard disk, etc.), and the like.

The sensor device 256 is a device which generates an image. Examples of the sensor device 256 include imaging devices, such as a digital still camera, digital video camera, and the like, and any sensor devices that have a function of generating an image by imaging, such as an infrared sensor, range imaging sensor, and the like.

An example of the sensor device 256 will be specifically described. An imaging device functioning as the sensor device 256 has, for example, a lens (not shown) of an optical system, an imaging element (not shown), a pixel array (not shown) corresponding to the imaging element (not shown), and a driver (not shown).

The imaging element (not shown) according to the present embodiment is, for example, a complementary metal oxide semiconductor (CMOS) or charge coupled device (CCD). Also, the imaging element (not shown) according to the present embodiment may be a stacked imaging element, which includes a CMOS, and other constituent elements such as a CCD and the like which are stacked on the CMOS. Thus, the sensor 200 including an imaging device as the sensor device 256 can capture an image using the global shutter method or the rolling shutter method.

The pixel array (not shown) has a configuration in which a plurality of pixel circuits are arranged in a matrix. The pixel circuits are each electrically connected to the driver (not shown) through a signal line. The pixel circuit includes, for example, a light reception element, such as a photodiode or the like, a transistor, a capacitance element, and the like. In the pixel circuit, for example, signal charge depending on incident light is accumulated, and the pixel circuit is initialized, according to a control signal transmitted from the driver (not shown) through the signal line.

Examples of the transistor included in the pixel circuit include bipolar transistors, field-effect transistors (e.g., a thin film transistor (TFT), metal-oxide-semiconductor field effect transistor (MOSFET), etc.), and the like. The capacitance element included in the pixel circuit is, for example, a capacitor. Note that the capacitance element included in the pixel circuit may include a parasitic capacitance of an interconnect or the like.

The driver (not shown) transmits a control signal to the pixel circuit to drive the pixel circuit.

The imaging device functioning as the sensor device 256 has the above configuration, for example. Note that, needless to say, the configuration of the imaging device is not limited to the above example.

The communication device 258 is, for example, a device for communicating with an external device through an external bus connected thereto, such as the data bus B1, the control bus B2, or the like. The communication device 258 is, for example, any device that can perform communication in accordance with any standard that allows for time-division multiplexing transmission of data, such as the CSI-2 standard, PCI Express, or the like.

The sensor 200 has, for example, the configuration shown in FIG. 4 to output an image at an output timing based on control information. Note that, needless to say, the configuration of the sensor 200 is not limited to the example shown in FIG. 4.

The processes in the sensor 200 involved with outputting of an image on the basis of control information will be more specifically described. The sensor 200 performs, as the processes involved with outputting of an image on the basis of control information, one or both of an output process according to a first example described below in (I) and an output process according to a second example described below in (II), for example. The processes in the sensor 200 involved with outputting of an image on the basis of control information is, for example, performed by the processor 250 included in the sensor 200 looking up control information 272 stored in the register 254.

(I) Output Process According to First Example: Control Information Contains Data (First Output Information) Indicating Amount of Delay in Output of Image When the control information contains data indicating a delay amount, the sensor 200 outputs an image after a delay of the delay amount indicated by the data indicating the delay amount.

In the sensor 200, for example, the delay in output of an image is achieved by holding the image in the above "recording medium for temporarily holding an image," or the above "holding capacitance included in an imaging device supporting the global shutter method which functions as the sensor device 256."

For example, when the data indicating a delay amount is data which directly indicates the delay amount, the sensor 200 outputs an image after a period of time corresponding to the delay amount indicated by the data indicating the delay amount has elapsed since a predetermined point of time.

The predetermined point of time is, for example, a point of time when an image capture command or a synchronization signal is received, a point of time when exposure in imaging is ended, or the like. For example, the data indicating the predetermined point of time may be previously stored in the ROM 252 or the like, or may be stored in the control information.

Also, for example, when the data indicating a delay amount is data which indirectly indicates the delay amount, the sensor 200 specifies the delay amount on the basis of the data indicating the delay amount. For example, when the data which indirectly indicates a delay amount indicates an ID associated with the delay amount, the sensor 200 specifies the delay amount by looking up it in a table (or a database) in which IDs and delay amounts are associated with each other, the table being stored in a recording medium, such as the ROM 252 or the like. Thereafter, the sensor 200 outputs an image after a period of time corresponding to the specified delay amount has elapsed since the predetermined point of time.

Also, when only the output process according to the first example is performed, the sensor 200 outputs packets of an image at set output intervals, for example. For example, the sensor 200 specifies the set output interval by looking up data indicating the output interval which is stored in a recording medium, such as the ROM 252 or the like.

(II) Output Process According to Second Example: Control Information Contains Data (Second Output Information) Indicating Output Interval Between Packets which is Used when Image is Output When the control information contains data indicating an output interval between packets, the sensor 200 outputs packets of an image at the output intervals indicted by the data indicating the output interval between packets.

For example, when the data indicating an output interval between packets is data which directly indicates the output interval, the sensor 200 outputs one packet, and thereafter, outputs the next packet after a period of time corresponding to the output interval indicated by the data indicating the output interval between packets has elapsed.

Also, for example, when the data indicating an output interval between packets is data which indirectly indicates the output interval, the sensor 200 specifies the output interval on the basis of the data indicating the output interval between packets. For example, when the data indirectly indicating an output interval indicates an ID associated with the output interval, the sensor 200 specifies the output interval by looking up it in a table (or a database) in which IDs and output intervals are associated with each other, the table being stored in a recording medium, such as the ROM 252 or the like. The sensor 200 outputs one packet, and thereafter, outputs the next packet after a period of time corresponding to the specified output interval has elapsed.

Also, when only the output process according to the second example is performed, the sensor 200 outputs an image after a delay of a set delay amount, for example. The sensor 200 specifies the set delay amount by looking up data indicating the delay amount which is stored in a recording medium, such as the ROM 252 or the like, for example.

For example, the sensor 200 performs one or both of the output process according to the first example described above in (I) and the output process according to the second example described above in (II). Therefore, in the system 1000, images captured during a predetermined period of time are output by the sensors 200 at output timings based on the control information which is set in the sensors 200 by the processor 100. Thereafter, in the system 1000, the image output by each sensor 200 through the data bus B1 is acquired by the processor 100.

Note that the process involved in outputting of an image according to the control information in the sensor 200 according to the present embodiment is not limited to the output process according to the first example described above in (I) or the output process according to the second example described above in (II).

For example, when the control information contains data indicating an image size, the sensor 200 outputs an image having the image size indicated by the control information.

Also, when control information contains data indicating a frame rate, the sensor 200 outputs an image at the frame rate indicated by the control information.

Also, when control information contains data indicating an image size and data indicating a frame rate, the sensor 200 outputs an image having the image size indicated by the control information at the frame rate indicated by the control information.

<4> Memory 300

The memory 300 is a recording medium included in the system 1000. Examples of the memory 300 include volatile memories (e.g., RAM, etc.), non-volatile memories (e.g., a flash memory, etc.), and the like.

The memory 300 stores an image output by each sensor 200, for example. The recording of an image into the memory 300 is controlled by, for example, the processor 100.

<5> Display Device 400

The display device 400 is a display device included in the system 1000. Examples of the display device 400 include a liquid crystal display, organic electro-luminescence (EL) display, organic light emitting diode (OLED) display, and the like.

The display screen of the display device 400 displays various images and screens, such as, for example, an image output by each sensor 200, a screen involved with an application executed by the processor 100, a screen involved with user interface (UI), and the like. The display of an image or the like on the display screen of the display device 400 is controlled by, for example, the processor 100.

<6> Effects Exhibited by System 1000, and Variations of System 1000

The system 1000 has, for example, the configuration shown in FIG. 1.

In the system 1000, the processor 100 and the plurality of sensors 200 are connected together by the data bus B1. Also, in the system 1000, the output of an image performed by the plurality of sensors 200 is controlled by the processor 100 performing the image output control. Therefore, in the system 1000, images captured during a predetermined period of time which are independently output by the plurality of sensors 200 connected to the data bus B1 are transmitted by time-division multiplexing on the data bus B1. Thereafter, the processor 100 can receive the images independently output by the plurality of sensors 200 through the data bus B1.

Therefore, when the processor 100 (the processing apparatus according to the present embodiment) and the plurality of sensors 200 (the image sensor according to the present embodiment) are connected together by the data bus B1, images which have been captured by the plurality of sensors 200 during a predetermined period of time can be transmitted through the data bus B1.

Also, the system 1000 provides, for example, a "mechanism which performs time-division multiplexing, on the same data bus B1, with respect to images independently output by a plurality of sensors 200 which perform image capture at synchronized timings (an example in which the plurality of sensors 200 perform image capture during a predetermined period of time)".

Also, in the system 1000, the processor 100 and the plurality of sensors 200 are connected together by the data bus B1. Therefore, compared to a case where an existing standard such as the CSI-2 standard is simply utilized, the number of data buses connected to the processor 100 can be reduced.

Also, in the system 1000, the reduction in the number of data buses connected to the processor 100 results in the following effects.

A wiring region where the processor 100 and the plurality of sensors 200 are connected together can be reduced.

The hardware configuration of the processor 100 can be further simplified due to, for example, a reduction in the number of terminals for connecting the data buses.

Note that the configuration of the system according to the present embodiment is not limited to the example shown in FIG. 1.

For example, when images output by a plurality of sensors 200 are stored in a recording medium external to the system, or when images output by a plurality of sensors 200 are stored in a memory included in the processor 100, the system according to the present embodiment may not have the memory 300 shown in FIG. 1.

Also, the system according to the present embodiment can have a configuration which does not have the display device 400 shown in FIG. 1.

Also, the system according to the present embodiment may have any configuration that is suitable for a function possessed by an electronic apparatus (described below) to which the system according to the present embodiment is applied.

Also, the system according to the present embodiment may have a configuration in which M data buses (where M is an integer smaller than the number of the sensors 200) are connected to the processor. Even when the system according to the present embodiment has a configuration in which M data buses (where M is an integer smaller than the number of the sensors 200 included in the system) are connected to the processor, the number of the data buses connected to the processor can be reduced, compared to when an existing standard such as the CSI-2 standard or the like is simply employed.

<7> Application Example of System According to the Present Embodiment

In the foregoing, a system has been described as the present embodiment by way of example. The present embodiment is not limited to this. The present embodiment is applicable to various electronic apparatuses, such as communication apparatuses (e.g., a smartphone, etc.), mobile apparatuses (e.g., a drone (an apparatus which can be remotely operated or autonomously operate), automobile, etc.), computers (e.g., a personal computer (PC), etc.), tablet-type apparatuses, game apparatuses, and the like.

Also, in the foregoing, a processor has been described as a processing apparatus included in the system according to the present embodiment by way of example. The processing apparatus according to the present embodiment is not limited to the above example. For example, the processing apparatus according to the present embodiment is applicable to any processing circuit or device that can perform the output control of an image which is output by each of a plurality of image sensors connected to a data bus, through the data bus.

Output Example of Image in System According to the Present Embodiment

Next, an output example of an image in the system 1000 will be described. In the description that follows, an example will be described in which a signal is transmitted through the data bus B1 in accordance with the CSI-2 standard.

Figure 5:
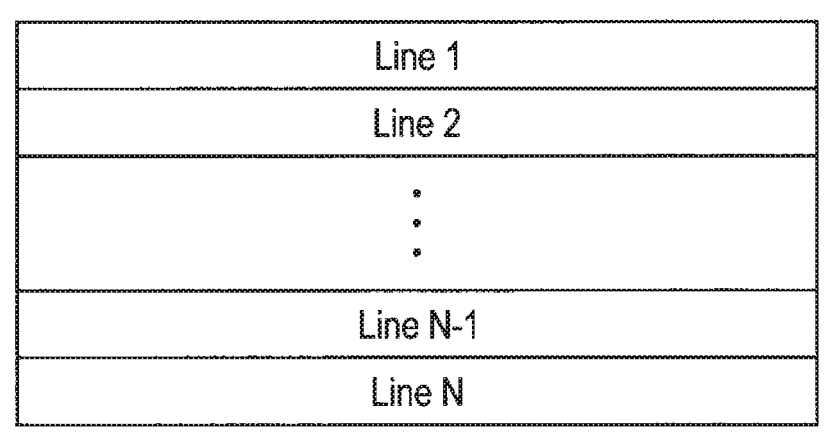

FIG. 5 shows an example of data of an image captured by the sensor 200 included in the system 1000 according to the present embodiment.

For example, the data of the image captured by the sensor 200 includes N lines of data (where N is an integer of 1 or more), and is output to the data bus B1 on a line-by-line basis.

FIG. 6 shows an example of a packet sequence of image data which is transmitted through the data bus B1 included in the system 1000 according to the present embodiment, in accordance with the CSI-2 standard. In FIG. 6, "FS" indicates a frame start (FS) packet, and "FE" indicates a frame end (FE) packet under the CSI-2 standard. Also, in FIG. 6, "PH" indicates a packet header, and "PF" indicates a packet footer.

In the CSI-2 standard, after an FS packet P1 is issued at the head of image data, N image data packets P2 are issued, and finally, an FE packet P3 is issued. There is an interval called a line blanking BL1 between one image data packet P1 and another image data packet P1. There is an interval called a frame blanking BL2 between an FE packet P3 and the next FS packet P1.

FIG. 7 shows an example of a frame buffer which is allocated in the memory 300 included in the system 1000 according to the present embodiment.

The processor 100, when receiving the packet sequence shown in FIG. 6, records the received image data into the frame buffer of the memory 300 as shown in FIG. 7.

In the system 1000, when an image captured by the sensor 200 is transmitted in accordance with the CSI-2 standard, the packet sequence of image data shown in FIG. 6 is transmitted on the data bus B1, and the image data received by the processor 100 is recorded into the frame buffer as shown in FIG. 7.

Next, an example of an output timing of an image output by the sensor 200 will be described, indicating an example case where the sensor 200 includes an imaging device as the sensor device 256.

<I> Output Example of Image in Accordance with Supported Shutter Method

Prior to describing an example of an output timing of an image output by the sensor 200, which is achieved under the output control of the processor 100, an image output example in accordance with a shutter method supported by an imaging device included in the sensor, will be described.

(I-1) Case where Imaging Device Supports Rolling Shutter Method

FIG. 8 is an explanatory diagram showing an example of an operation of a sensor equipped with an imaging device which supports the rolling shutter method. FIG. 8 shows an operation of a sensor equipped with an imaging device which supports the rolling shutter method (may hereinafter be referred to as a "sensor supporting the rolling shutter method") where a line N of an image is captured, and image data corresponding to the line N is output.

In FIG. 8, "pixel RST" indicates resetting of pixels. In FIG. 8, "pixel RD" indicates reading of charge accumulated depending on incident light. In FIG. 8, "AD conversion" indicates conversion of an analog signal depending on read charge into a digital signal by an analog-to-digital conversion circuit (not shown), in the description that follows, the same applies to the other figures.

When a line N of an image is captured, a sensor supporting the rolling shutter method resets pixels corresponding to the line N (pixel RST shown in FIG. 8). Here, the pixel resetting corresponds to an operation of opening the shutter of the imaging device.

In the sensor supporting the rolling shutter method, signal charge depending on light entering a pixel is accumulated (accumulation shown in FIG. 8), and thereafter, the accumulated charge is read out (pixel RD shown in FIG. 8). Here, the reading of the accumulated charge corresponds to an operation of closing the shutter of the imaging device.

In the sensor supporting the rolling shutter method, the read charge is analog-to-digital converted (AD conversion shown in FIG. 8) to obtain digital data corresponding to the line N, and the digital data is output to the data bus (data output shown in FIG. 8).

FIG. 9 is an explanatory diagram showing an example of an operation of a sensor equipped with an imaging device supporting the rolling shutter method. In the example, the operation for a line N shown in FIG. 8 is successively performed for a plurality of lines, a line 1 to a line N (in FIG. 9, N is an integer of 4 or more).

As shown in FIG. 9, in the sensor supporting the rolling shutter method, a series of operations, i.e., pixel resetting (pixel RST shown in FIG. 9) to data output (data output shown in FIG. 9), are performed for each line at a respective different timing in order to avoid a collision between digital data corresponding to lines which is output to the data bus.

FIG. 10 is an explanatory diagram showing an example of operations of two sensors each equipped with an imaging device supporting the rolling shutter method. FIG. 10 shows an example of a case where the operation shown in FIG. 9 is performed in each of the two sensors (a sensor #1 and a sensor #2) supporting the rolling shutter method so that time-division multiplexing is performed with respect to image data on the data bus.

In order to prevent the two sensors supporting the rolling shutter method to output data to the data bus at the same timing, it is necessary to cause the two sensors supporting the rolling shutter method to capture images at different timings as shown in FIG. 2. Therefore, in the example shown in FIG. 10, after one sensor outputs data corresponding to all lines to the data bus, the other sensor outputs data corresponding to all lines to the data bus. Therefore, in the example shown in FIG. 10, the two sensors supporting the rolling shutter method do not capture images at the same time (or captured images are not regarded as being captured at the same time).

(I-2) Case where Imaging Device Supports Global Shutter Method

FIG. 11 is an explanatory diagram showing an example of an operation of a sensor equipped with an imaging device supporting the global shutter method. FIG. 11 shows an operation of a sensor equipped with an imaging device supporting the global shutter method (may hereinafter be referred to as a "sensor supporting the global shutter method") where a line N of an image is captured, and image data corresponding to the N is output.

When a line N of an image is captured, the sensor supporting the global shutter method resets pixels corresponding to the line N (pixel RST shown in FIG. 11).

In the sensor supporting the global shutter method, signal charge depending on light entering a pixel is accumulated (accumulation shown in FIG. 11), and thereafter, the accumulated charge is read out (pixel RD shown in FIG. 11).

In the sensor supporting the global shutter method, the read charge is transferred to, for example, a capacitance element adjacent to the pixel, and is held by the capacitance element (capacitance holding of FIG. 11), unlike the sensor supporting the rolling shutter method. In the description that follows, a capacitance element which holds read charge, such as the above capacitance element adjacent to the pixel, is referred to as a "holding capacitance."

In the sensor supporting the global shutter method, the charge held by the holding capacitance is analog-to-digital converted (AD conversion shown in FIG. 11) to obtain digital data corresponding to the line N, and the digital data is output to the data bus (data output shown in FIG. 11). In other words, in the sensor supporting the global shutter method, the analog-to-digital conversion and the output of data to the data bus can be delayed by the holding capacitance holding charge.

FIG. 12 is an explanatory diagram showing an example of an operation of a sensor equipped with an imaging device supporting the global shutter method where the operation for a line N shown in FIG. 12 is successively performed for a plurality of lines, a line 1 to a line N (in FIG. 12, N is an integer of 4 or more).

As shown in FIG. 12, in the sensor supporting the global shutter method, pixel resetting (pixel RST shown in FIG. 12) can be started for all lines simultaneously. Also, for example, as shown in FIG. 12, in the sensor supporting the global shutter method, the accumulation of signal charge (accumulation shown in FIG. 12) and the reading of accumulated charge (pixel RD shown in FIG. 12) are performed for all lines simultaneously. Note that, in the sensor supporting the global shutter method, the accumulation of signal charge (accumulation shown in FIG. 12) and the reading of accumulated charge (pixel RD shown in FIG. 12) can be changed on a line-by-line basis.

The sensor supporting the global shutter method transfers charge read from each line to the holding capacitance so that the charge is held by the holding capacitance (capacitance holding shown in FIG. 12), analog-to-digital converts the charge held in the holding capacitance successively on a line-by-line basis, and outputs the data to the data bus (AD conversion and data output shown in FIG. 12). Note that, for the sake of convenience, FIG. 12 does not show that, in the line 1 (line 1 shown in FIG. 12), read charge is transferred to the holding capacitance, and is held by the holding capacitance (note that this is not shown in FIG. 13 and FIG. 14 described below, as in FIG. 12).

For example, as shown in FIG. 12, in the sensor supporting the global shutter method, charge read from each line can be held by the holding capacitance. Therefore, data corresponding to different lines can be output to the data bus at different timings so that data collision can be avoided.

<II> Example of Output of Image by Sensor 200 in System 1000

Next, an example of output of an image performed by the sensor 200 in the system 1000 will be described.

In the description that follows, a case where the sensor device 256 included in the sensor 200 included in the system 1000 is a sensor supporting the global shutter method, and temporarily holds an image using a holding capacitance, will be mainly described by way of example. As described above, when the holding capacitance included in the sensor supporting the global shutter method is utilized to temporarily hold an image, the sensor 200 may not be equipped with a recording medium for temporarily holding an image, such as a RAM or the like. Also, as described above, the sensor 200 can be equipped with a recording medium for temporarily holding an image, such as a RAM or the like, so that the sensor 200 can also temporarily hold an image.

(II-1) First Output Example

FIG. 13 is an explanatory diagram showing a first example of output of an image performed by the sensor 200 in the system 1000 according to the present embodiment. FIG. 13 shows an example of operations of the sensors 200A and 200B, each of which includes a sensor supporting the global shutter method as the sensor device 256. The sensor 200A and the sensor 200B synchronously operate through the control bus B2, for example.

In the sensors 200A and 200B, pixels are reset (pixel RST shown in FIG. 13) synchronously on the basis of reception of the synchronization signal Vsync, and thereafter, signal charge is accumulated (accumulation shown in FIG. 13), and the accumulated charge is read out (pixel RD shown in FIG. 13), for example.

Also, as described above with reference to FIG. 12, the sensors 200A and 200B each transfer charge read from each line to the holding capacitance so that the charge is held by the holding capacitance (capacitance holding shown in FIG. 13), analog-to-digital convert the charge held by the holding capacitance on a line-by-line basis, and output data to the data bus B1 (AD conversion and data output shown in FIG. 13). The data output to the data bus B1 which corresponds to each line, corresponds to a "packet of an image."

Here, as described above, the sensors 200A and 200B each output an image at an output timing based on the control information stored in the register 254, for example.

For example, when data indicating a delay amount is contained in the control information, the sensors 200A and 200B each hold the charge read from each line in the holding capacitance so that output is delayed by the delay amount corresponding to the data indicating the delay amount.

Also, when data indicating an output interval between packets is contained in the control information, the sensors 200A and 200B each output data corresponding to each line to the data bus B1 at the output intervals indicated by the data indicating the output interval.

In the example shown in FIG. 13, a delay amount indicated by the control information stored in the register 254 included in the sensor 200B is larger than a delay amount indicated by the control information stored in the register 254 included in the sensor 200A. More specifically, in the example shown in FIG. 13, the control information according to which, after the sensor 200A outputs data corresponding to all lines to the data bus B1, the sensor 200B outputs data corresponding to each line, is stored in the register 254 of each of the sensors 200A and 200B.

Here, in the example shown in FIG. 13, the intervals at which the sensor 200A outputs data corresponding to each line (packet of an image) are the same as the intervals at which the sensor 200B outputs data corresponding to each line. Alternatively, the intervals at which the sensors 200A and 200B each output data are not limited to the example shown in FIG. 13. For example, the sensors 200A and 200B may each output data corresponding to each line to the data bus B1 at output intervals indicated by the control information so that the data output interval of the sensor 200A is different from the data output interval of the sensor 200B.

For example, as shown in FIG. 13, the sensors 200A and 200B can each output an image at an output timing based on the control information so that images having the same image capture timing (images captured during a predetermined period of time) between the sensors 200A and 200B are transmitted by time-division multiplexing on the data bus B1.

(II-2) Second Output Example

FIG. 14 is an explanatory diagram showing a second example of output of an image performed by the sensor 200 in the system 1000 according to the present embodiment. FIG. 14 shows another example of operations of the sensors 200A and 200B each equipped with a sensor supporting the global shutter method as the sensor device 256. The sensor 200A and the sensor 200B operate synchronously through the control bus B2, for example.

The operation of each of the sensors 200A and 200B shown in FIG. 14 is the same as the operation of each of the sensors 200A and 200B in the first output example shown in FIG. 13. However, the control information which is looked up by each of the sensors 200A and 200B is different from that in the example shown in FIG. 13, and there is a difference in the order in which image data is output, between the second output example shown in FIG. 14 and the first output example shown in FIG. 13.

In the example shown in FIG. 14, a delay amount indicated by the control information stored in the register 254 included in the sensor 200B, is larger than a delay amount indicated by the control information stored in the register 254 included in the sensor 200A. More specifically, in the example shown in FIG. 14, the control information according to which the output of data corresponding to each line to the data bus B1 performed by the sensor 200A, and the output of data corresponding to each line to the data bus B1 performed by the sensor 200B, are alternately performed, is stored in the register 254 of each of the sensors 200A and 200B.

Here, in the example shown in FIG. 14, the intervals at which the sensor 200A outputs data corresponding to each line (packet of an image) are the same as the intervals at which the sensor 200B outputs data corresponding to each line. The intervals at which the sensors 200A and 200B each output data are not limited to the example shown in FIG. 14. For example, the sensors 200A and 200B may each output data corresponding to each line to the data bus B1 at output intervals indicated by the control information so that the data output interval of the sensor 200A and the data output interval of the sensor 200A are different from each other (within a range which does not cause data collision on the data bus B1).

For example, as shown in FIG. 14, the sensors 200A and 200B can each output an image at an output timing based on the control information so that images having the same image capture timing (images captured during a predetermined period of time) between the sensors 200A and 200B are transmitted by time-division multiplexing on the data bus B1.

(II-3) Other Output Examples

The example of output of an image performed by the sensor 200 in the system 1000 according to the present embodiment is not limited to the first output example described above in (II-1) and the second output example described above in (II-2).

For example, in the first output example shown in FIG. 13 and the second output example shown in FIG. 14, the output of images performed by the two sensors 200A and 200B has been described by way of example. However, even when the system 1000 includes three or more sensors 200, each sensor 200 can output an image at an output timing based on the control information so that images output by the sensors 200 are transmitted by time-division multiplexing on the data bus B1, as in the first output example and the second output example.

Also, in the first output example shown in FIG. 13 and the second output example shown in FIG. 14, an "example in which a plurality of sensors 200 are each equipped with a sensor supporting the global shutter method as the sensor device 256, and hold charge in a holding capacitance to adjust the timing of output of data to the data bus B1" has been described. However, in the system 1000, for example, the sensors 200 may be equipped with a recording medium, such as a RAM or the like, for temporarily holding an image, and hold data corresponding to each line obtained by analog-to-digital conversion in the recording medium, whereby the timing of output of data to the data bus B1 by each sensor 200 is adjusted.

Even when the sensors 200 are configured to hold data corresponding to each line in a recording medium, such as a RAM or the like, each sensor 200 can output an image at an output timing based on control information so that images output by the sensors 200 can be transmitted by time-division multiplexing on the data bus B1, as in the first output example and the second output example. Also, when the sensors 200 are configured to hold data corresponding to each line in a recording medium, such as a RAM or the like, the sensors 200 can be equipped with a sensor supporting the global shutter method, or a sensor device other than the sensor supporting the global shutter method, such as the above sensor supporting the rolling shutter method or the like, as the sensor device 256, for example.

<III> Example of Process Involved in Control of Output of Image by Processor 100 (Process in Control Method According to According to the Present Embodiment)

Next, an example of a process involved in control of output of an image performed by the processor 100, which can provide the above example of output of an image performed by the sensor 200 in the system 1000, will be described.

FIG. 15 is a flowchart showing an example of a process involved in control of output of an image performed by the processor 100 included in the system 1000 according to the present embodiment (a process involved in the control method according to according to the present embodiment). FIG. 15 shows an example of a process involved in control of output of an image performed by the processor 100 in a case where the system 1000 has two image sensors 200A and 200B.

The processor 100 turns on each of the sensors 200A and 200B to be controlled, and thereby releases their reset status (S100). The process of step S100 corresponds to an example of a process of initializing the sensors 200A and 200B, for example.

The processor 100 configures register settings for the sensor 200A (S102). The processor 100 configures the register settings for the sensor 200A by transmitting control information through the control bus B2.

Here, the processor 100 configures the register settings for the sensor 200A by transmitting control information in which, for example, the sensor 200A is designated, and the address of a register included in the sensor 200A is designated. Alternatively, the processor 100 can configure the register settings for the sensor 200A by transmitting control information in which all sensors 200 to be controlled are designated, and the address of a register included in each sensor 200 is designated, for example. The transmission of the control information in which all sensors 200 to be controlled are designated, and the address of a register included in each sensor 200 is designated, is effective in synchronously recording the same data into the registers included in all of the sensors 200, for example.

The processor 100 configures register settings for the sensor 200B (S104). As in step S102, the processor 100 configures the register settings for the sensor 200B by transmitting control information through the control bus B2.

The processor 100 causes each of the sensors 200A and 200B to capture an image and output image data to the data bus B1 (S106). The processor 100 transmits control information through the control bus B2 to cause each of the sensors 200A and 200B to capture an image and output image data to the data bus B1.

The processor 100 performs, for example, the process shown in FIG. 15 as a process involved in the image output control. Note that, needless to say, the example of a process involved in the image output control is not limited to the example shown in FIG. 15.

For example, the control information is recorded into the register included in the sensor 200 by the processor 100 controlling output of an image as shown in FIG. 15. Also, as described above, the sensor 200 outputs an image at an output timing based or the control information.

Thus, for example, by the processor 100 performing the process involved in the image output control shown in FIG. 15, the above example of output of an image performed by the sensor 200 in the system 1000 can be achieved.

Program According to the Present Embodiment

By a program or the like for causing a computer to function as the processing apparatus according to the present embodiment (e.g., a program for causing a computer to perform a process involved in the image output control (a process involved in the control method according to according to the present embodiment)) being executed by a computer, a "mechanism which performs time-division multiplexing, on the same data bus B1, with respect to images independently output by a plurality of image sensors 200 which perform image capture at synchronized timings (an example in which the plurality of sensors 200 perform image capture during a predetermined period of time)" can be provided, for example.

Also, effects exhibited by the above process involved in output control of an image (the process involved in the control method according to the present embodiment) can be exhibited by a program for causing a computer to function as the processing apparatus according to the present embodiment being executed by a processor or the like in the computer.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the foregoing has indicated that a program (computer program) for causing a computer to function as the processing apparatus according to the present embodiment is provided. Furthermore, in the present embodiment, a recording medium storing the above program can be additionally provided.

The above configuration is an example of the present embodiment, and of course, is within the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A processing apparatus including:

a processing unit that is connectable to a data bus, and performs output control on respective images captured by a plurality of image sensors connected to the data bus during a predetermined period of time, wherein a timing of output of the image performed by each of the plurality of image sensors is changed by the output control.

(2)

The processing apparatus according to (1), wherein the processing unit controls, as the output control, a delay when the image sensor outputs the image.

(3)

The processing apparatus according to (1) or (2), wherein the processing unit controls, as the output control, output intervals at which packets are output when the image sensor outputs the image.

(4)

The processing apparatus according to any one of (1) to (3), wherein the processing unit performs the output control by transmitting control information to each of the plurality of image sensors.

(5)

The processing apparatus according to (4), wherein the control information is transmitted through a control bus which is different from the data bus and which is connected to the respective image sensors.

(6)

The processing apparatus according to (4) or (5), wherein the control information is recorded in a register included in the image sensor.

(7)

The processing apparatus according to any one of (1) to (6), wherein the images captured during the predetermined period of time are images which are synchronously captured by the plurality of image sensors.

(8)

An image sensor that is connectable to a data bus to which another image sensor is connected, and outputs an image captured during a predetermined period of time, at an output timing based on control information.

(9)

The image sensor according to (8), wherein the control information contains first output information indicating a delay amount when an image is output, and the image is output after a delay of the delay amount indicated by the first output information.

(10)

The image sensor according to (8) or (9), wherein the control information contains second output information indicating output intervals at which packets are output when an image is output, and the packets of the image are output at the output intervals indicated by the second output information.

(11)

The image sensor according to any one of (8) to (10), wherein the control information is stored in a register.

(12)

A system including:
a plurality of image sensors that are connected to a data bus, and
a processing apparatus that is connected to the data bus, wherein
the processing apparatus includes a processing unit that performs output control on respective images captured by the plurality of image sensors during a predetermined period of time, and
a timing of output of the image in each of the plurality of image sensors is changed by the output control.

REFERENCE SIGNS LIST 100, 250 processor
102 processing unit
200, 200A, 200B sensor
252 ROM
254 register
256 sensor device
258 communication device
260 internal bus
270 identification information
272 control information
300 memory
400 display device
1000 system
B1 data bus
B2 control bus

The invention claimed is:

1. A processing apparatus comprising:
a processing circuitry configured to
send respective timing control outputs to a plurality of image sensors via one or more control buses, and
receive respective images from the plurality of image sensors via a single common data bus based on the respective timing control outputs that are sent to the plurality of image sensors, the single common data bus being different than the one or more control buses,
wherein one or more image sensors of the plurality of image sensors are individually configured to capture one image of the respective images by performing a global shutter method,
wherein the one or more image sensors individually include a holding capacitance that is configured to temporarily hold the one image of the respective images, and
wherein each image sensor of the plurality of image sensors includes an array of pixels.

2. The processing apparatus according to claim 1, wherein each timing control output of the respective timing control outputs includes a timing that delays an output of an image from each image sensor of the plurality of image sensors.

3. The processing apparatus according to claim 1, wherein each timing control output of the respective timing control outputs includes a plurality of timings that are output at intervals at which packets of an image from each image sensor of the plurality of image sensors are output.

4. The processing apparatus according to claim 1, wherein the processing circuitry is further configured to perform time-division multiplexing of the respective images from the plurality of image sensors with the respective timing control outputs.

5. The processing apparatus according to claim 4, wherein the processing circuitry is further configured to control each of the plurality of image sensors to record one of the respective timing control outputs in a register.

6. The processing apparatus according to claim 1, wherein the respective images captured by the plurality of image sensors are captured substantially at the same time.

7. The processing apparatus according to claim 1, wherein each image of the respective images includes image data based on all pixel signals from a corresponding array of pixels of the plurality of image sensors.

8. An image device comprising:
an image sensor configured to
capture an image by performing a global shutter method,
temporarily hold the image with a holding capacitance,
receive a timing control output via a control bus, and
output the image that is captured via a single common data bus based on the timing control output, the single common data bus being different than the control bus, and the single common data bus being shared with other image sensors, wherein, to capture the image by performing the global shutter method, the image sensor is further configured to capture the image by performing the global shutter method on an array of pixels.

9. The image device according to claim 8, wherein the timing control output includes a timing that delays the output of the image that is captured.

10. The image device according to claim 8, wherein the timing control output includes timings that are output intervals at which packets of the image that is captured are output.

11. The image device according to claim 8, wherein the image sensor further includes a register, and responsive to receiving the timing control output, the image sensor is further configured to store the timing control output in the register.

12. The image device according to claim 8, wherein the image includes image data based on all pixels signals output from the array of pixels.

13. A system comprising:
a single common data bus;
one or more control buses that are different than the single common data bus;
a plurality of image sensors that are connected to the single common data bus and the one or more control buses, each of the plurality of image sensors are configured to capture an image; and
a processing circuitry that is connected to the single common data bus and the one or more control buses, the processing circuitry is configured to send respective timing control outputs to the plurality of image sensors via the one or more control buses, wherein
the plurality of image sensors are configured to receive the respective timing control outputs from the processing circuitry, and output respective images that are captured to the processing circuitry via the single common data bus based on the respective timing control outputs that are received,
one or more image sensors of the plurality of image sensors are individually configured to capture one of the respective images by performing a global shutter method,
the one or more image sensors individually include a holding capacitance that is configured to temporarily hold the one of the respective images, and
each image sensor of the plurality of image sensors includes an array of pixels.

14. The system according to claim 13, wherein each timing control output of the respective timing control outputs includes a timing that delays an output of the image from the each of the plurality of image sensors.

15. The system according to claim 13, wherein each timing control output of the respective timing control outputs includes a plurality of timings that are output at intervals at which packets of the image from the each of the plurality of image sensors are output.

16. The system according to claim 13, wherein the processing circuitry is further configured to perform time-division multiplexing of the respective images from the plurality of image sensors with the respective timing control outputs.

17. The system according to claim 13, wherein the processing circuitry is further configured to control each of the plurality of image sensors to record one of the respective timing control outputs in a register.

18. The system according to claim 13, wherein the respective images captured by the plurality of image sensors are captured substantially at the same time.

19. The system according to claim 13, wherein each of the respective images includes image data based on all pixel signals from a corresponding array of pixels of the plurality of image sensors.

* * * * *